United States Patent [19]
Hoffman et al.

[11] Patent Number: 5,020,563
[45] Date of Patent: Jun. 4, 1991

[54] CONNECTOR SET

[75] Inventors: Richard E. Hoffman, Overland Park, Kans.; Richard Topping, Framingham, Mass.; Tom W. Nelson, Lenexa, Kans.; Marie L. Murville, Cambridge; Paul Belkus, Whitinsville, both of Mass.

[73] Assignee: Gas Research Institute, Chicago, Ill.

[21] Appl. No.: 542,310

[22] Filed: Jun. 22, 1990

[51] Int. Cl.$^5$ .............................................. F16K 17/40
[52] U.S. Cl. .................................. 137/75; 137/614.06; 251/149.9
[58] Field of Search ................. 137/72, 74, 75, 614.05, 137/614.06, 613, 360, 361; 251/149.9

[56] References Cited
U.S. PATENT DOCUMENTS

| | | | |
|---|---|---|---|
| 1,631,953 | 6/1927 | Anderson | 137/361 |
| 2,179,416 | 11/1939 | Malear | 137/361 |
| 2,256,780 | 9/1941 | McIntosh | 137/361 |
| 3,087,703 | 4/1963 | Windel | 251/149.9 |
| 3,100,619 | 8/1963 | Berghöfer et al. | 251/149.9 |
| 3,474,810 | 10/1969 | Welsh | 137/75 |
| 3,477,689 | 11/1969 | Berghoefer | 251/149.9 |
| 3,532,101 | 10/1970 | Snyder, Jr. | 137/75 |
| 4,825,893 | 5/1989 | Gailey | 137/75 |

Primary Examiner—John Rivell
Attorney, Agent, or Firm—Senniger, Powers, Leavitt & Roedel

[57] ABSTRACT

A connector set adapted for releasably connecting a gas conduit from a gas appliance or the like to a gas line to provide gas to the appliance. The connector set comprises a nipple adapted to be connected to the gas conduit and a receptacle adapted to be connected to the gas line. The receptacle has a socket adapted to receive the nipple, and first and second valves. The valves are each operable between an open position and a closed position and arranged so that gas can pass from the gas line to the socket only when both valves are in their open positions. The receptacle further includes a mechanism for operating the second valve as the first valve is operated so that the second valve opens when the first valve opens and closes when the first valve closes. The first valve is operable only when the nipple is in the socket, and the nipple is removable from the socket only when the first valve is in its closed position.

28 Claims, 4 Drawing Sheets

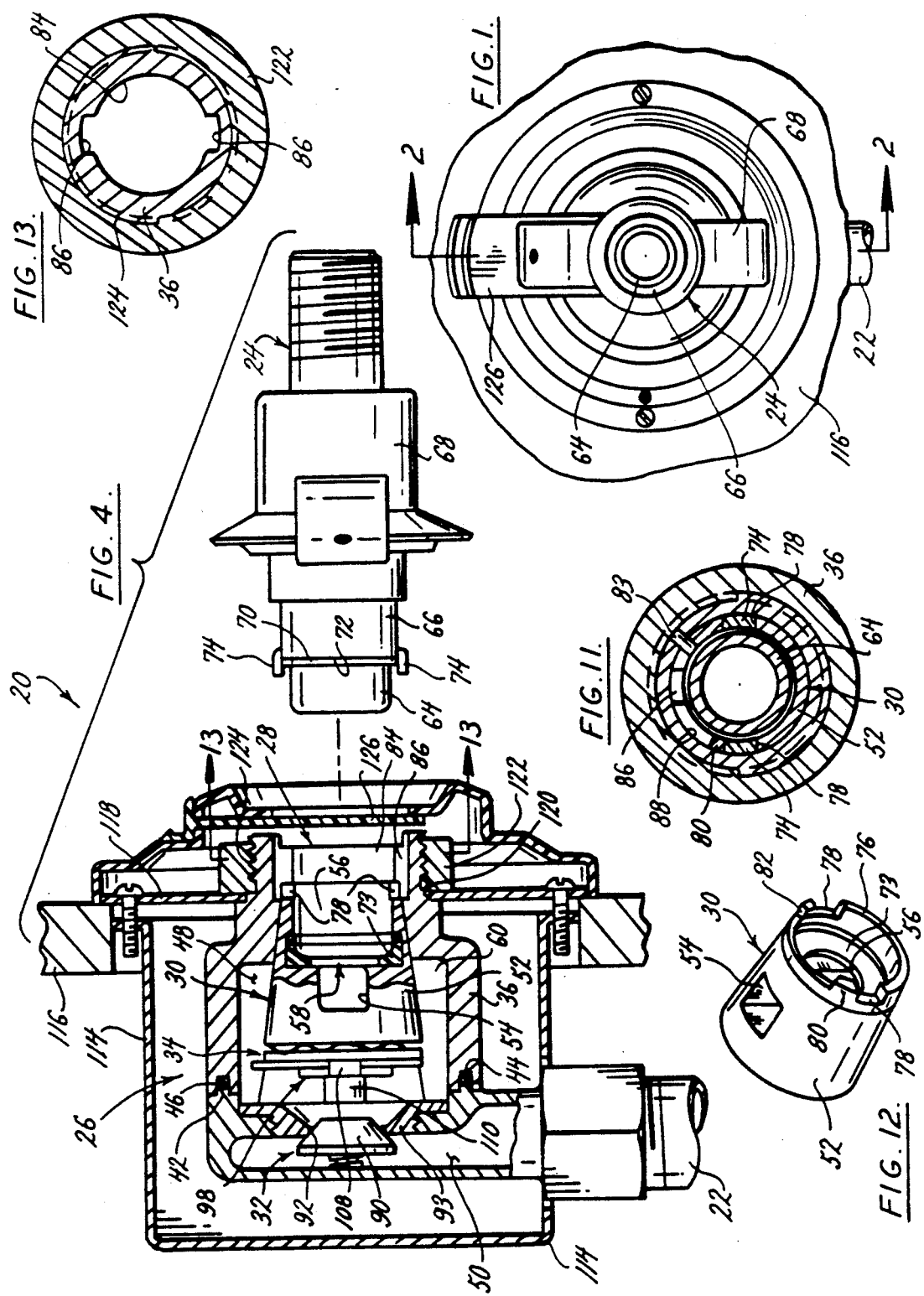

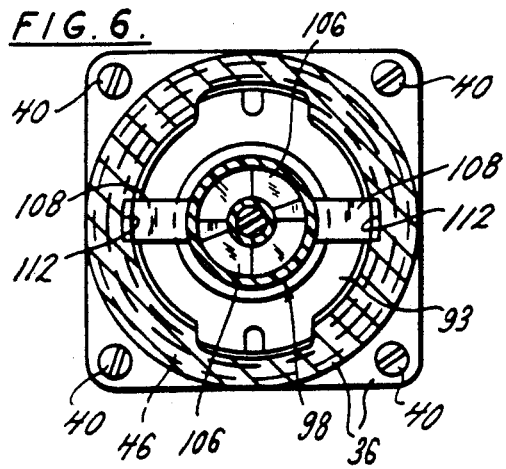
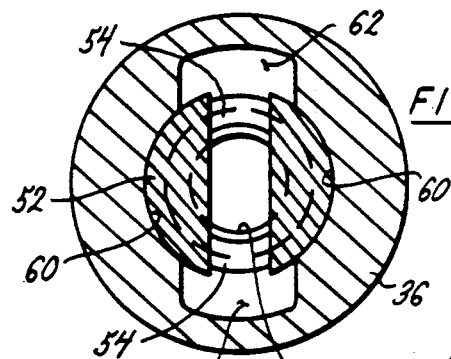
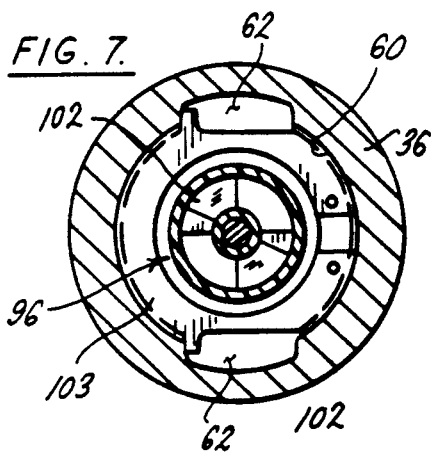
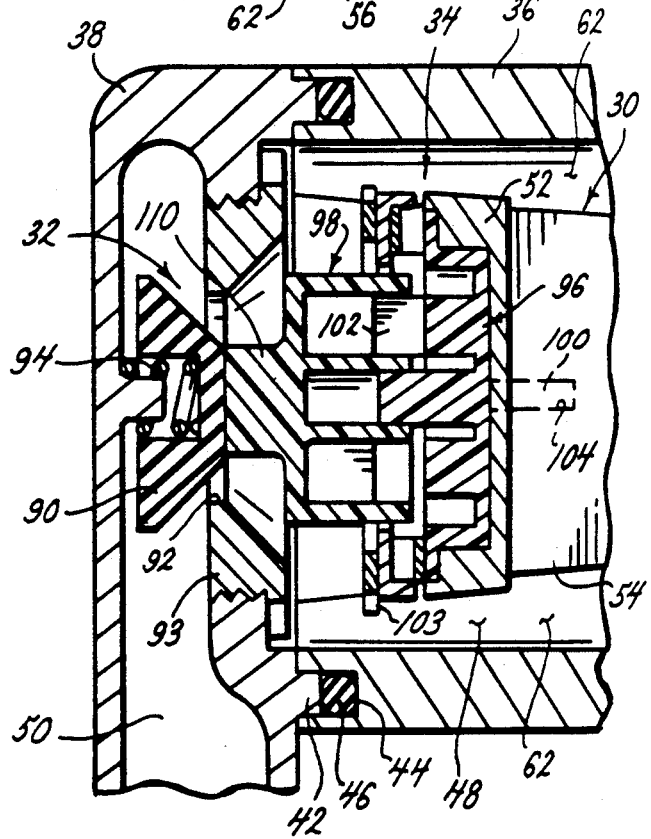
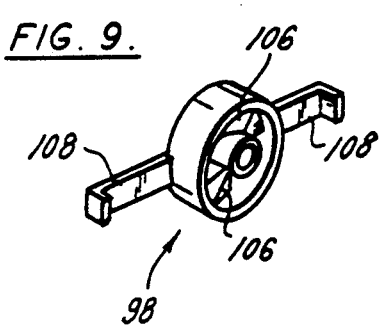

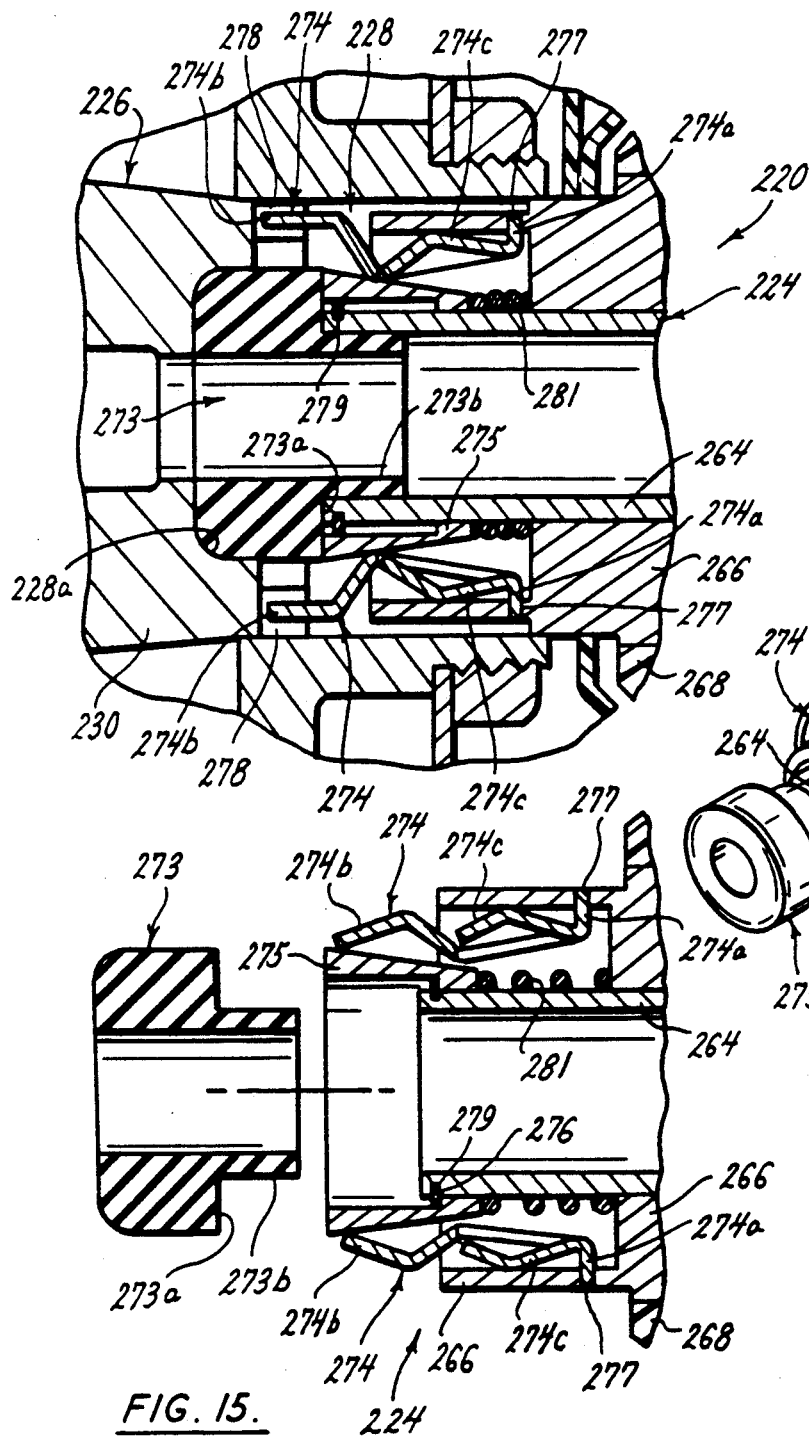
FIG. 14.
FIG. 15.
FIG. 16.
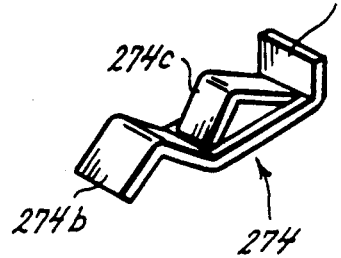
FIG. 17.

CONNECTOR SET

BACKGROUND OF THE INVENTION

This invention relates generally to connectors, and in particular to connector sets for releasably connecting gas conduits from gas appliances to gas lines to provide gas to the appliances.

Gas connectors are used in residences to readily connect and disconnect gas appliances, such as cooking stoves, clothes driers, and other devices, to incoming gas lines. Many connectors comprise two primary members, a receptacle (outlet) and a nipple (plug). The receptacle includes a socket for receiving the nipple and is secured to a wall of a residence. The incoming gas line connects to the receptacle. The nipple is connected to an appliance. Gas is provided to the appliance by inserting the nipple into the socket.

One problem associated with gas couplings is the hazard of gas escaping if the nipple is removed before the supply of gas to the socket is interrupted. If the gas flow is not interrupted, there is a risk of fire and a risk that persons will breathe the dangerous gas fumes.

Another problem is that the sockets are not always tamper resistant. It is possible that a child playing with such a socket could accidentally cause gas to escape from the socket.

Another problem with these devices is the fact that gas continues to flow through the plug/socket connection even in the presence of fire or dangerously excessive heat.

SUMMARY OF THE INVENTION

Among the objects of the present invention may be noted the provision of a connector set for releasably connecting a gas conduit from a gas appliance or the like to a gas line to provide gas to the appliance; the provision of such a connector set comprising a nipple and a receptacle having a socket for receiving the nipple, and from which the nipple cannot be removed unless gas flow through the receptacle is stopped; the provision of such a connector set in which the receptacle has two valves, both of which must be open before gas can flow through the receptacle; the provision of such a connector set in which the valves cannot be opened unless the nipple is inserted into the socket; the provision of such a connector set in which at least one of the valves is disabled upon being heated to a temperature in excess of a predetermined temperature to close the valve and prevent flow of gas through the receptacle; the provision of such a connector set in which the valves cannot be opened unless a seal member is properly positioned between the nipple and socket; and the provision of such a connector set which is of relatively simple and inexpensive construction.

Generally, the connector set of the present invention is adapted for releasably connecting a gas conduit from a gas appliance or the like to a gas line to provide gas to the apPliance. The connector set comprises a nipple adapted to be connected to the gas conduit and a receptacle adapted to be connected to the ga line. The receptacle has a socket adapted to receive the nipple, and first and second valves. The valves are each operable between an open position and a closed position and arranged so that gas can pass from the gas line to the socket only when both valves are in their open positions. The receptacle further includes means for operating the second valve as the first valve is operated so that the second valve opens when the first valve opens and closes when the first valve closes. The first valve is operable only when the nipple is in the socket, and the nipple is removable from the socket only when the first valve is in its closed position.

Preferably, the means for operating the second valve as the first valve is operated is disabled upon being heated to a temperature in excess of a predetermined temperature so that the second valve closes and remains closed regardless of whether the first valve is open.

Thus, with the connector set of the present invention, the nipple cannot be removed from the socket without closing the valves and thereby stopping gas flow through the receptacle. Both valves of the connector set must be opened before gas can flow through the receptacle, and the valves cannot be opened unless the nipple is inserted into the socket. Thus, gas will only pass from the receptacle when it is properly connected to an appliance. Also, during a fire or dangerously excessive heat, the means for operating the second valve is disabled and the second valve closes and remains closed. Thus, the connector set minimizes the chance of a fire being fueled by gas through the socket.

These and other advantages will be in part apparent and in part pointed out hereinafter.

BRIEF DESCRIPTION OF THE DRAWINGS

FIG. 1 is a front elevational view of a connector set of the present invention with the nipple in the socket of the receptacle;

FIG. 4 is a side elevational view of the connector set, in partial cross-section, showing the nipple removed from the socket and showing the valves of the receptacle in their closed positions;

FIG. 5 is an enlarged partial longitudinal cross-sectional view of the receptacle showing the valves in their open positions;

FIG. 6 is a transverse cross-sectional view of the receptacle taken along the plane of line 6—6 in FIG. 2, showing a cam mechanism which operates the second valve;

FIG. 7 is a transverse cross-sectional view of the receptacle taken along the plane of line 7—7 in FIG. 2, showing a spring clip holding a first ramp member on the first valve;

FIG. 8 is a transverse cross-sectional view of the receptacle taken along the plane of line 8—8 of FIG. 2, showing the first valve in its open position;

FIG. 9 is a perspective view of the second ramp member of the cam mechanism;

FIG. 10 is a perspective view of the first ramp member of the cam mechanism;

FIG. 11 is a transverse cross-sectional view of the receptacle taken along the plane of line 11—11 of FIG. 2, showing the nipple inserted into the socket of the receptacle;

FIG. 12 is a perspective view of the first valve;

FIG. 13 is a transverse cross-sectional view of the receptacle taken along the plane of line 13—13 in FIG. 4;

FIG. 14 is a cross-sectional view of a second embodiment of a connector set of the present invention with the nipple in the socket of the receptacle;

FIG. 15 is a cross-sectional view of the nipple of the connector set of FIG. 14 showing the seal removed from the nipple;

FIG. 16 is a perspective view of the nipple of FIG. 15 showing the seal removed from the nipple; and FIG. 17 is a perspective view of one of the ears of the nipple of FIG. 15.

Corresponding reference numerals indicate corresponding parts throughout the several views of the drawings.

DETAILED DESCRIPTION OF THE PREFERRED EMBODIMENTS

Figure 3:
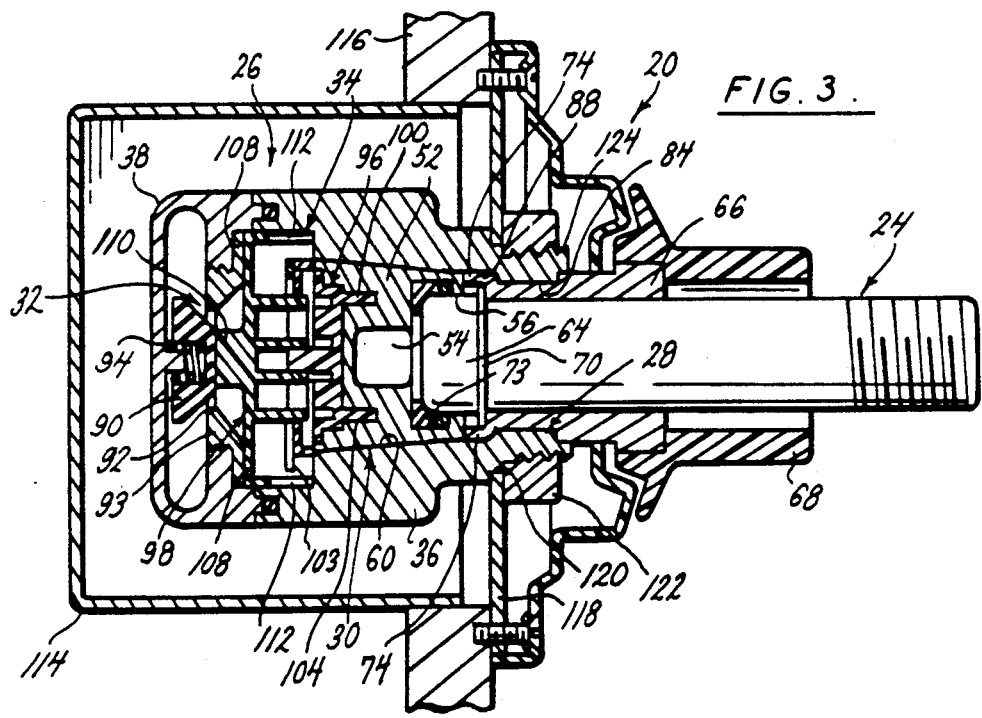
FIG. 3 is a longitudinal cross-sectional view of the connector set taken along the plane of line 3—3 in FIG. 2.
Figure 2:
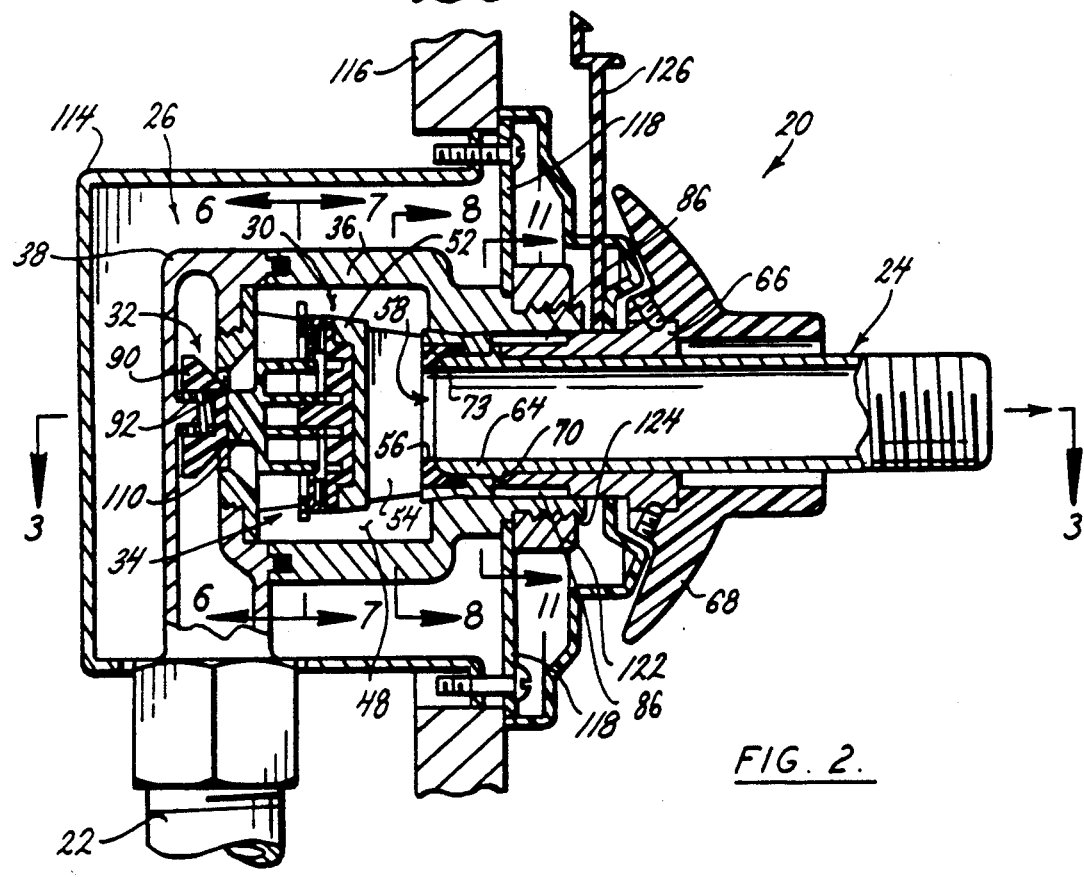
FIG. 2 is a longitudinal cross-sectional view of the connector set taken along the plane of line 2—2 of FIG. 1 showing the valves in the receptacle in their open positions.

A connector set constructed according to the principles of this invention is indicated generally as 20 in FIGS. 1-4. The connector set 20 is adapted for releasably connecting a gas conduit (not shown) from a gas appliance, such as a stove or clothes drier, to a gas line 22 to provide gas to the appliance. The connector set 20 comprises a nipple, indicated generally as 24, adapted to be connected to the gas conduit and a receptacle, indicated generally at 26, adapted to be connected to the gas line 22. The receptacle 26 has a socket 28 adapted to receive the nipple 24, first and second valves 30 and 32, and a cam mechanism 34. The valves 30 and 32 are each operable between an open position and a closed position and are arranged in series so that gas can pass from the gas line 22 to the socket 28 only when both valves 30 and 32 are in their open positions. The cam mechanism 34 constitutes means for operating the second valve 32 as the first valve 30 is operated so that the second valve 32 opens when the first valve 30 opens and closes when the first valve 30 closes. As discussed in greater detail below, the first valve 30 is operable only when the sleeve 66 and handle 68 are in the socket 28, and the nipple 24 can be removed from the socket 28 only when the first valve 30 is in its closed position.

The receptacle 26 comprises a forward housing (or portion) 36 and a rearward housing (or portion) 38. The forward housing 36 defines a forward chamber 48 and the socket 28, and contains the first valve 30, and the cam mechanism 34. The rearward housing 38 defines a rearward chamber 50 communicating with gas line 22, and contains the second valve 32. When the second valve 32 is in its open position, gas can flow from the rearward chamber 50 to the forward chamber 48. When the first valve 30 is in its open position, gas can flow from the forward chamber 48 through socket 28 to the nipple 24. The forward housing 36 is releasably secured to the rearward housing 38 by four screws 40, shown in FIG. 6. The rearward housing 38 includes an annular rim 42 which mates with an annular groove 44 in the forward housing 36 for aligning the housings 36 and 38 with respect to each other. An elastomeric O-ring 46 fits within the groove 44 and abuts the rim 42 to seal the connection between the housings 36, 38. Because the receptacle 26 has a double valve construction, with one valve in each of the housings, the forward housing 36 can be removed from the rearward housing 38 for servicing of the receptacle 26, and the second valve 32 will prevent the escape of gas.

The first valve 30 is operable between its open position and its closed position by rotation of the valve 30 within the forward housing 38. As shown in FIGS. 8 and 12, the first valve 30 has a generally frustrum-shaped body 52, transverse apertures 54 through the sides of the body 52, and an axial bore 56 adjacent the front of the body 52. The apertures 54 and bore 56 communicate to define a passageway 58 through the body 52. The forward chamber 48 is defined by opposing arcuate surfaces 60 on the inside of the forward housing 36 (see FIGS. 3, 7 and 8) and recessed regions 62 (at the six and twelve o'clock positions). The surfaces 60 diverge rearwardly and are dimensioned to support the valve body 52 for rotation only, and constrain the valve body 52 from any lateral or forward movement. As shown in FIG. 8, when the first valve 30 is in its open position, the apertures 54 of the valve body 52 are in fluid communication with the recessed regions 62 of the forward chamber 48. Thus, gas flowing from the rearward chamber 50 to the forward chamber 48 can pass into recessed regions 62 and then through the apertures 54 and out the axial bore 56. When the first valve 30 is rotated approximately seventy degrees within the forward chamber 48, from its open position shown in FIG. 8 to its closed position, the surfaces 60 sealingly close the apertures 54, and gas flow through the passageway 58 is prevented.

The first valve 30 is opened and closed by rotation of the nipple 24 in the socket 28. The nipple 24 comprises a tube 64, a sleeve 66 around the tube 64, and a handle 68 fixed to the sleeve 66. The tube 64 has a circumferential stop 70 dimensioned to abut a first end 72 of the sleeve 66 to prevent the tube 64 from sliding out of the sleeve 66. An annular seal 73 in the first valve 30 abuts the end of the tube 64 when the nipple 24 is inserted in the socket 28 to prevent gas leakage between the first valve 30 and tube 64. The tube 64 is adapted to be connected to a gas conduit from a gas appliance. The sleeve 66 rotates relative to the tube 64 so that when the nipple 24 is inserted in the socket 28 and rotated, the tube 64 and the gas conduit from the appliance do not rotate. Thus, operation of the valves and connection of the nipple 24 to the socket 28 is accomplished without rotation of the gas conduit from the appliance. The sleeve 66 includes two ears 74 projecting from the first end 72. As shown in FIGS. 11 and 12, a forward portion 76 of the first valve 30 has two recesses 78 dimensioned for receiving the ears 74. With the ears 74 disposed in the recesses 78, rotation of the sleeve 66 within the socket 28 causes the valve 30 to rotate. The forward portion 76 of the first valve 30 further includes first and second stops 80 and 82 adapted to engage a pin 83 (see FIG. 11) fixed to and extending radially inwardly from the forward housing 36 into the socket 28. When the first valve 30 is rotated to the position where the first stop 80 abuts the pin 83, the first valve 30 is in its open position. When the first valve 30 is rotated to the position where the second stop 82 abuts the pin 83, the first valve 30 is in its closed position. Referring to FIGS. 4 and 13, the socket 28 has a mouth 84, the diameter of which is approximately the same diameter as the first end 72 of the sleeve 66. The mouth 84 includes diametrically opposite longitudinal slots 86 (see FIG. 13) dimensioned for receiving the ears 74 for insertion and removal of the sleeve 66, and a circumferential recess 88 (see FIG. 3) within which the ears 74 turn during rotation of the sleeve 66 within the socket 28. The sleeve 66 can be inserted and removed only when the ears 74 are aligned with the slots 86. The ears 74 are constrained within the recess 88 when the nipple 24 is rotated. Thus, the receptacle 26 is constructed to retain the nipple 24 in the socket 28 as the valve 30 is rotated to its open Position, and the sleeve 66 can be removed from the socket 28 only when the first valve 30 is in its closed position.

The second valve 32 comprises a conical valve member 90 and a valve seat 92. The valve seat 92 is formed in a threaded insert 93 in the rearward housing 38, and comprises a circular opening between the forward chamber 48 and rearward chamber 50. A spring 94, positioned between the valve member 90 and the back wall of the rearward housing 38, resiliently urges the valve member 90 against the valve seat 92 to close the second valve 32.

The second valve 32 is opened, i.e., the valve member 90 is pushed away from the valve seat 92, when the first valve 30 is rotated clockwise to its open position. This is accomplished by the cam mechanism 34. The cam mechanism 34 comprises first and second ramp members 96 and 98. As shown in FIG. 10, the first ramp member 96 includes forwardly extending pins 100 and first ramps 102 on its rearward face. The pins 100 engage apertures 104 (see FIG. 3) in the rear face of the first valve 30 so that the first ramp member 96 turns with the first valve 30. A C-shaped spring clip 103 (see FIGS. 5 and 7) is secured to the surface 60 of the forward housing 36 to hold the first ramp member 96 on the first valve 30 and to prevent rearward movement of the first ramp member 96 and the first valve 30. The second ramp member 98 includes second ramps 106, anti-rotation arms 108, and a rearwardly extending fusible nub 110. The anti-rotation arms 108 extend into recesses 112 in the forward housing 36 to prevent rotation of the second ramp member 98. The first and second ramp members 96 and 98 interfit, with the first ramp member 96 being rotatable relative to the second ramp member 98, the second ramps 106 contacting the first ramps 102, and the nub 110 abutting the downstream face of the valve member 90 of the second valve 32. When the first valve 30 and first ramp member 96 are rotated clockwise to the first valve's open position, the first ramps 102 push against the second ramps 106 to move the second ramp member 98 rearwardly (upstream). As the second ramp member 98 moves rearwardly, the nub 110 pushes against the valve member 90 to open the second valve 32. Thus, the second valve 32 opens when the first valve 30 is opened, and because of the bias of spring 94, the second valve closes when the first valve closes.

The configuration of the ramps 102 and 106 is such that the second valve 32 will not begin to open until the first valve 30 is substantially in its fully open position and such that the second valve 32 will then substantially instantaneously move to its fully open position, thus ensuring a substantially instantaneous full flow of gas to the appliance. This avoids the risk of a situation where only a relatively small amount of gas, insufficient to cause combustion, flows through the valves.

The nub 110 is adapted to melt when the receptacle 26 is subjected to a temperature in excess of a Predetermined temperature. When the nub 110 melts, it can no longer push against the valve member 90 of the second valve 32 and, therefore, the spring 94 urges the valve member 90 against the valve seat 92 to close the second valve 32. Thus, the cam mechanism 34 is disabled upon being heated to a predetermined temperature so that the second valve 32 closes and remains closed regardless of whether the first valve 30 is open.

The receptacle 26 may be contained in a box 114 secured to the wall 116 of a building. The box 114 is similar to an electrical outlet box. A mounting plate 118 is secured to the box 114 and includes an aperture 120 through which the socket 28 extends. A ring nut 122 mates with a threaded outer surface 124 of the socket 28 to secure the receptacle 26 to the mounting plate 118. A gravity door 126 is mounted on the mounting plate 118 and helps keep debris out of the socket 28 when the receptacle is not being used. To make a connection, the door 126 is lifted and the nipple 24 is inserted into the socket 28.

In operation, the first and second valves 30 and 32 are operated by rotation of the sleeve 66 in the socket 28. When the nipple 24 is inserted into the socket 28 and the sleeve 66 rotated, the first valve 30 rotates to its open position. As the first valve 30 rotates to its open position, the ramps 102 of the first ramp member 96 rotate with respect to the ramps 106 of the second ramp member 98 to push the second ramp member rearwardly, and push the nub 110 against the valve member 90 to open it. Gas can then flow from chamber 50 past the valve seat 92 to the chamber 48. The gas passes through the recessed regions 62 and through the passageway 58 of the valve 30. The gas then passes through the socket 28 and the nipple 24. While the valves are open, the ears 74 are trapped in the recess 88. It is only when the ears 74 are aligned with slots 86 (which only occurs when the valves are closed) that the nipple can be removed from the socket. When the first valve 30 is rotated counter-clockwise to its closed position, the ramps 102 rotate with respect to the ramps 106 and the spring 94 pushes the valve member 90 and the second ramp member 98 axially forward to close the second valve 32. Thus, the first and second valves 30 and 32 are operated by rotation of the nipple 24 in the socket 28. Also, when the receptacle 26 is heated to a predetermined temperature, such as occurs during a fire, the nub 110 melts to disable the cam mechanism 34 and close the second valve, thereby automatically stopping the flow of gas.

A second embodiment of a connector set constructed according to the principles of this invention is indicated generally as 220 in FIGS. 14-16, having a modified nipple indicated generally as 224. The connector set 220 is similar to the connector set 20 of FIGS. 1-13. Thus, for simplicity, the components of the connector set 220 have the same reference numerals as the corresponding components of the connector set 20 except the components of set 220 include the prefix "2". In this embodiment, the valves in the receptacle 226 cannot open unless a seal member 273 is positioned for sealing against gas leakage around the nipple 224 (i.e., between the nipple and the socket wall 228a) when the nipple 224 is inserted in the socket 228.

The nipple 224 comprises a tube 264, a sleeve 266 around the tube 264, a handle 268 fixed to the sleeve 266, spring-biased ears 274, and a cone-shaped cam 275. Each ear 274 includes a secured end portion 274a, a free end portion 274b, and an intermediate spring portion 274c. The secured end portions 274a of the ears extend into corresponding slots 277 in the sleeve 266 and are thereby secured to the sleeve 266. The free end portions 274b of the ears constitute means for engaging the first valve 230 to rotate the first valve 230 as the nipple 224 is rotated. The free end portions 274b are movable between an actuating position (see FIG. 14), and a non-actuating position (see FIGS. 15 and 16). In the actuating position, the free end portions 274b extend radially outwardly to engage recesses 278 in the first valve 230 so that the first valve 230 rotates when the nipple 224 is rotated in the socket 228. In the non-actuating position, the free end portions of the ears 274b are retracted radially inwardly from the stated actuating position so that they will not engage the recesses 278 when the nipple 224 is inserted in the socket 228. The spring portions 274c urge the free end portions 274 toward their non-actuating positions.

The cam 275 is constituted by a collar slideable on the tube 264. The cam 275 has a conical outer surface and is movable between a first position and a second position. In the first position (see FIG. 14), the cam 275 is slid forward (downstream) on the tube 264 and pushes against the ears 274 to move the free end portions 274b to their actuating positions. In the second position (see FIGS. 15 and 16), the cam 275 is slid rearward (upstream) on the tube 264. A radially extending pin 279 on the rearward end of the tube 264 is engageable with an annular lip 276 on the collar to prevent the cam 274 from becoming separated from the tube 264. A helical spring 281 positioned between the cam 275 and the sleeve 266 biases the cam 275 rearward towards its second position.

The seal member 273 has an annular forward facing surface 273a and a cylindric forward end 273b projecting forward from the surface 273a. The seal member is preferably attached to the nipple 224. This is accomplished by inserting the cylindric end 273b of the seal member in the rearward end of the tube 264, the cylindric end being held in place by a friction force greater than the force from the spring 281. As the forward end 273b is inserted in the tube 264, the forward facing surface 273a pushes the cam 275 forward to its first position, which causes the free end portions 274b of the ears to be cammed radially outwardly to their actuating position. When the nipple and seal assembly are inserted in the socket 228, the seal member is engageable with the wall 228a of the first valve 230 to seal against leakage around the nipple.

In operation, the first valve 230 can be rotated to its open position only when the seal member 273 is properly positioned to seal against gas leakage, i.e., only when the forward end 273b of the seal member 273 is inserted in the tube 264. When the seal member is in this position, the free end portions 274b of the ears are held in their actuating positions by cam 275 so that the free end portions enter the recesses 278 as the nipple 224 is inserted in the socket 228. Thus, the cam 275 and the free end portions 274b of the ears constitute means for enabling operation of the first valve 230 when the seal member 273 is attached to the nipple. If the forward end 273b of the seal member is not inserted in the tube 264, the cam 275 is biased to its second position by the spring 281, and the free end portions 274b are biased to their non-actuating positions by the spring portion 274c. Thus, if the seal member 273 is not attached to the nipple 224, the first valve 230 cannot be opened by rotation of the nipple 224 in the socket 228, thereby ensuring against leakage of gas through the valve. Also, the nipple 224 is removable from the socket 228 only when the first valve 230 is in its closed position.

In the above embodiment, the seal member 273 is shown as attached to the nipple. However, it will be understood that the seal member could be adapted for mounting in the socket 228 without departing from the scope of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A connector set for releasably connecting a gas conduit from a gas appliance or the like to a gas line to provide gas to the appliance, the connector set comprising a nipple adapted to be connected to the gas conduit, and a receptacle adapted to be connected to the gas line, the receptacle having a socket adapted to receive the nipple, first and second valves, each operable between an open position and a closed position and arranged so that gas can pass from the gas line to the socket only when both valves are in their open positions, and means for operating the second valve as the first valve is operated so that the second valve opens when the first valve opens and closes when the first valve closes, the first valve being operable only when the nipple is in the socket, and the nipple being removable from the socket only when the first valve is in its closed position.

2. The connector set of claim 1 wherein the first valve is opened and closed by rotation of the nipple in the socket.

3. The connector set of claim 2 wherein the second valve comprises a valve member and a valve seat, the valve member being seated against the valve seat when the second valve is in its closed position.

4. The connector set of claim 3 further comprising a spring adapted for urging the valve member against the valve seat, and wherein said means for operating the second valve comprises a cam mechanism which pushes against the valve member as the first valve is opened to open the second valve.

5. The connector set of claim 4 wherein the receptacle is constructed to retain the nipple in the socket as the nipple is rotated to open the first valve.

6. The connector set of claim 4 wherein the first valve is adapted for rotating with the nipple as the nipple is rotated to open the first valve.

7. The connector set of claim 6 wherein the cam mechanism pushes against the valve member to open the second valve as the nipple is rotated within the socket.

8. The connector set of claim 7 wherein the cam mechanism includes a first ramp and a ramp, the first lamp being adapted to abut the second ramp as the first valve is rotated to cause a portion of the cam mechanism to move toward the valve member of the second valve to thereby push against the valve member to open the second valve.

9. The connector set of claim 8 wherein the cam mechanism further comprises a nub adapted to abut the valve member and adapted to melt when the receptacle is subjected to a temperature in excess of a predetermined temperature whereby when the nub melts said spring urges the valve member against the valve seat to close the second valve.

10. The connector set of claim 8 wherein the ramps are configured so that the second valve does not begin to open until the first valve is substantially in its fully open position and the second valve will then substantially instantaneously move to its fully open position.

11. The connector set of claim 1 wherein the means for operating the second valve as the first valve is operated is disabled upon being heated to a temperature in excess of a predetermined temperature so that the second valve closes and remains closed regardless of whether the first valve is open.

12. A connector set for releasably connecting a gas conduit from a gas appliance or the like to a gas line to provide gas to the appliance, the connector set comprising a nipple adapted to be connected to the gas conduit, and a receptacle adapted to be connected to the gas line, the receptacle having a socket adapted to receive the nipple, first and second valves, each operable between an open position and a closed position and arranged so that gas can pass from the gas line to the socket only when both valves are in their open positions, and means for operating the second valve as the first valve is operated so that the second valve opens when the first valve opens and closes when the first valve closes, the first valve being operable only when the nipple is in the socket, and the nipple being removable from the socket only when the first valve is in its closed position, said receptacle further comprising a forward portion and a rearward portion, the first valve and the socket being disposed within the forward portion and the second valve being disposed within the rearward portion, the forward portion being releasably secured to the rearward portion.

13. The connector set of claim 12 wherein the second valve is biased closed when the forward portion is released from the rearward portion.

14. The connector set of claim 13 wherein the first valve is opened and closed as the nipple is rotated within the socket.

15. The connector set of claim 14 wherein the receptacle is adapted to secure the nipple in the socket as the nipple is rotated to open the first valve.

16. The connector set of claim 14 wherein the first valve includes a valve portion adapted for rotating with the nipple as the nipple is rotated to open the first valve.

17. The connector set of claim 16 further comprising an aperture through said valve portion, said aperture aligning with a chamber in said forward portion and constituting a fluid passageway from the chamber to the appliance conduit when the valve portion is rotated to open the first valve, said aperture being out of alignment with and out of fluid communication with the chamber when the valve portion is rotated to close the first valve, said chamber being in fluid communication with the gas line when the second valve is in its open position.

18. The connector set of claim 17 wherein the second valve comprises a valve member and a valve seat, the valve member being seated against the valve seat when the second valve is in its closed position.

19. The connector set of claim 18 further comprising a spring disposed between the rearward portion and the valve member for urging the second valve toward said closed position, and wherein said means for opening the second valve comprises a cam mechanism which pushes against the valve member as the first valve is operated to open the second valve.

20. The connector set of claim 19 wherein the cam mechanism pushes against the valve member to operate the second valve as the nipple is rotated within the socket.

21. The connector set of claim 20 wherein the cam mechanism includes a first ramp and a second ramp, the first ramp being adapted to abut the second ramp as the valve portion is turned to cause a portion of the cam mechanism to move toward the valve member to thereby push against the valve member to open the second valve.

22. The connector set of claim 21 wherein the cam mechanism further comprises a nub adapted to abut the valve member to push the valve member away from the valve seat as the portion of the cam mechanism moves toward the valve member, said nub being adapted to melt when the receptacle is subjected to a temperature in excess of a predetermined temperature whereby when the nub melts said spring urges the valve member against the valve seat to close the second valve.

23. The connector set of claim 12 wherein the means for operating the second valve as the first valve is operated is disabled upon being heated to a temperature in excess of a predetermined temperature so that the second valve closes and remains closed regardless of whether the first valve is open.

24. A connector set for releasably connecting a gas conduit from a gas appliance or the like to a gas line to provide gas to the appliance, the connector set comprising:
a nipple adapted to be connected to the gas conduit;
a receptacle adapted to be connected to the gas line, the receptacle having a socket adapted to receive the nipple and a first valve movable between an open position and a closed position so that gas can pass from the gas line to the socket only when the first valve is in its open position, the first valve being operable only when the nipple is in the socket;
a seal member for sealing against gas leakage around the nipple when the nipple is inserted in the socket; and
means for enabling operation of the first valve when the seal member is positioned for sealing against said gas leakage, said first valve being disabled from said operation when the seal member is not positioned for sealing against said gas leakage.

25. The connector set of claim 24 wherein the first valve is rotatable within the receptacle between its open and closed positions, and wherein the first valve is rotated by rotation of the nipple in the socket.

26. The connector set of claim 25 wherein said enabling means comprises means on the nipple for engaging the first valve to rotate the first valve as the nipple is rotated, said engaging means being movable between an actuating position in which the engaging means is positioned to engage the first valve so that the first valve rotates when the nipple is rotated in the socket, and a non-actuating position in which the engaging means is not positioned to engage the first valve so that the first valve does not rotate when the nipple is rotated in the socket, and means for holding said engaging means in its actuating position when said seal member is positioned for sealing against said ga leakage.

27. The connector set of claim 25 wherein said seal member is adapted for attachment to the nipple.

28. The connector set of claim 27 further comprising spring means urging said engaging means toward its non-actuating position, said engaging means being movable to said actuating position against the urging of said spring means when the seal member is attached to the nipple.

* * * * *